United States Patent [19]
Busby

[11] Patent Number: 6,099,010
[45] Date of Patent: *Aug. 8, 2000

[54] BICYCLE WITH CRANK ASSEMBLY SUSPENSION SYSTEM

[75] Inventor: James S. Busby, Costa Mesa, Calif.

[73] Assignee: GT Bicycles, Inc., Santa Ana, Calif.

[*] Notice: This patent is subject to a terminal disclaimer.

[21] Appl. No.: 09/098,087

[22] Filed: Jun. 16, 1998

Related U.S. Application Data

[63] Continuation-in-part of application No. 08/959,377, Oct. 28, 1997.

[51] Int. Cl.[7] .................................................... B62K 3/02
[52] U.S. Cl. .......................................... 280/284; 280/283
[58] Field of Search ................................... 280/285, 283, 280/284, 281.1, 286, 275; 74/594.1

[56] References Cited

U.S. PATENT DOCUMENTS

| 439,095 | 10/1890 | Becker . |
| 578,615 | 3/1897 | Travis . |

(List continued on next page.)

FOREIGN PATENT DOCUMENTS

| 155582 | 3/1954 | Australia . | |
| 356881 | 10/1905 | France . | |
| 923235 | of 1947 | France . | |
| 2395879 | 3/1979 | France . | |
| 3033294 | 4/1981 | Germany | 280/285 |
| 421518 | of 1947 | Italy . | |
| 423515 | of 1947 | Italy . | |
| 428442 | 12/1947 | Italy | 280/285 |
| 540821 | 3/1956 | Italy | 280/284 |
| 5105168 | 4/1995 | Japan . | |
| 434883 | 4/1965 | Switzerland . | |
| 24918 | of 0000 | United Kingdom | 288/284 |
| 17336 | of 1913 | United Kingdom | 208/44 |
| 15332 | of 1915 | United Kingdom | 208/93 |
| 220760 | 8/1924 | United Kingdom . | |
| 2084456 | 9/1980 | United Kingdom . | |
| PCTGB920039 | 9/1992 | WIPO . | |
| PCTUS9300502 | 7/1993 | WIPO . | |

OTHER PUBLICATIONS

1992 Cannondale Spec—Suspension Mountain Biccyles—Article—10 pgs.
Guide To Suspension & High Performance; (Get With It) "Suspension Speak"; vol. 3, 1992; pp. 9, 13, 14, 30, 31, 36–45, 47, 53, 60, 69–, 85, 86, 92, 96, 98, 100, 108–112, 117 & 119.
"Schwinn Buell", Guide to Suspension, vol. 3, 1992, 4 pages.
Suspension Mania Strikes Cycling—Mountain Bike Action/ Feb. '92, 3 Pgs.
Boulder Intrepid Al—2 pgs.—Mountain Bike Action/Mar. '92.
Fischer RS–1—Article—4 pgs.—Mountain Bike Action/ Mar. '92.
"Litespeed Suspension", Mountain Bike Action—May '92, 1 page.
Schwinn S.A.S.S.—7 pgs.—Mountain Bike Action—May '92.
Bicycling, May, 1992, pp. 26, 27, 58, 63, 64, and 105.
Welcome to the Next Generation . . .—9 pgs.—Mountain Bike Action—Jun. '92.

(List continued on next page.)

Primary Examiner—Brian L. Johnson
Assistant Examiner—Avraham H. Lerner
Attorney, Agent, or Firm—Stetina Brunda Garred & Brucker

[57] ABSTRACT

A bicycle having an independent equilibrium sensing suspension system for its crank assembly. The bicycle comprises a main frame having a rear assembly pivotally connected thereto. Rotatably connected to the rear assembly is an eccentric link, while attached to and extending between the eccentric link and the main frame is a sensing link. Rotatably connected to the eccentric link is the crank assembly of the bicycle which is mechanically coupled to the rear wheel via a chain extending therebetween.

11 Claims, 4 Drawing Sheets

U.S. PATENT DOCUMENTS

| | | |
|---|---|---|
| 603,418 | 5/1898 | Andriance . |
| 606,323 | 6/1898 | Wronski . |
| 618,627 | 1/1899 | Travis . |
| 657,667 | 9/1900 | Mills . |
| 944,795 | 12/1909 | Leet et al. . |
| 1,047,430 | 12/1912 | Michaelson . |
| 1,130,828 | 3/1915 | Kuehn . |
| 1,257,761 | 2/1918 | Strand . |
| 1,298,958 | 4/1919 | Johnston . |
| 1,412,012 | 4/1922 | Bruno . |
| 1,594,079 | 1/1926 | Tanner . |
| 2,132,317 | 10/1938 | Pease ................. 280/284 |
| 2,283,671 | 5/1942 | Finlay et al. ............ 280/284 |
| 2,446,731 | 8/1948 | Wheler ................. 280/284 |
| 2,550,876 | 5/1951 | Spencer ................ 280/284 |
| 2,587,882 | 3/1952 | Corning ................ 155/164 |
| 3,290,949 | 12/1966 | Samet .................... 74/5 |
| 3,522,957 | 8/1970 | Topor .................. 280/283 |
| 3,917,313 | 11/1975 | Smith et al. ............ 280/284 |
| 3,942,821 | 3/1976 | Bock ................... 280/277 |
| 3,948,543 | 4/1976 | MacDonald et al. ....... 280/284 |
| 3,982,770 | 9/1976 | Satoh et al. ............ 280/284 |
| 3,984,119 | 10/1976 | Okazima ............... 280/276 |
| 4,039,200 | 8/1977 | McGonegle ............. 280/284 |
| 4,046,396 | 9/1977 | Taylor et al. ........... 280/281 |
| 4,057,264 | 11/1977 | Suzuki et al. ........... 280/276 |
| 4,058,181 | 11/1977 | Buell .................... 180/32 |
| 4,118,045 | 10/1978 | Kanazawa .............. 280/283 |
| 4,153,266 | 5/1979 | Uhis ................... 280/276 |
| 4,186,936 | 2/1980 | Offenstadt et al. ........ 280/277 |
| 4,322,088 | 3/1982 | Miyakoshi et al. ........ 280/284 |
| 4,367,882 | 1/1983 | Alexander et al. ........ 280/276 |
| 4,392,664 | 7/1983 | Tsuchiya et al. ......... 280/276 |
| 4,421,337 | 12/1983 | Pratt .................. 280/277 |
| 4,433,850 | 2/1984 | Miyakoshi et al. ........ 280/277 |
| 4,506,755 | 3/1985 | Tsuchida et al. ......... 180/227 |
| 4,507,011 | 3/1985 | Brown ................. 403/404 |
| 4,524,844 | 6/1985 | Williams, Jr. ........... 180/219 |
| 4,529,056 | 7/1985 | Kreuz ................. 180/227 |
| 4,568,101 | 2/1986 | Bleustein et al. ......... 208/707 |
| 4,609,202 | 9/1986 | Miyakoshi et al. ........ 280/276 |
| 4,673,053 | 6/1987 | Tanaka et al. ........... 180/227 |
| 4,679,811 | 7/1987 | Shuler ................. 280/284 |
| 4,721,322 | 1/1988 | Hawkins ............... 280/276 |
| 4,732,404 | 3/1988 | Coetzee ................ 280/283 |
| 4,735,276 | 4/1988 | Burton ................. 180/219 |
| 4,789,174 | 12/1988 | Lawwill ................ 280/284 |
| 4,792,150 | 12/1988 | Groendal et al. ......... 280/275 |
| 4,815,763 | 3/1989 | Hartmann .............. 280/276 |
| 4,951,791 | 8/1990 | Creixell ................ 180/219 |
| 4,997,197 | 3/1991 | Shultz ................. 280/275 |
| 5,000,470 | 3/1991 | Kamler et al. .......... 280/275 |
| 5,014,808 | 5/1991 | Savard et al. ........... 180/219 |
| 5,080,384 | 1/1992 | Groendal et al. ......... 280/275 |
| 5,098,114 | 3/1992 | Jones .................. 280/284 |
| 5,121,937 | 6/1992 | Lawwill ................ 280/284 |
| 5,205,572 | 4/1993 | Buell et al. ............ 280/284 |
| 5,226,674 | 7/1993 | Buell et al. ............ 280/284 |
| 5,240,269 | 8/1993 | Kerr ................... 280/285 |
| 5,244,224 | 9/1993 | Busby ................. 280/284 |
| 5,259,637 | 11/1993 | Busby ................. 280/284 |
| 5,269,552 | 12/1993 | Yelverton .............. 280/283 |
| 5,284,354 | 2/1994 | McWethy .............. 280/284 |
| 5,295,702 | 3/1994 | Buell .................. 280/284 |
| 5,306,036 | 4/1994 | Busby ................. 280/284 |
| 5,332,246 | 7/1994 | Buell .................. 280/284 |
| 5,335,929 | 8/1994 | Takagaki et al. ......... 280/283 |
| 5,354,085 | 10/1994 | Gally .................. 280/285 |
| 5,370,411 | 12/1994 | Takamiya et al. ........ 280/284 |
| 5,409,249 | 4/1995 | Busby ................. 280/284 |
| 5,441,292 | 8/1995 | Busby ................. 280/284 |
| 5,445,471 | 8/1995 | Wexler et al. .......... 403/220 |
| 5,498,013 | 3/1996 | Hwang ................ 280/283 |
| 5,553,881 | 9/1996 | Klassen et al. .......... 280/284 |

OTHER PUBLICATIONS

Team Shockblok—6 pgs.—Mountain Bike Action—Jul. '92.

Beating Around the Bush; Mountain Bike Action—Oct. 1992—21 pgs.

Mountain Biking, Nov. 1992, vol. 6, No. 11—22 pages.

Mountain Bike Action, Dec. 1992—14 pages.

Mountain Bike Action, "San Andreas Report Card—Peccadillos, Peculiarities & Traits", Dec. 1992, pp. 80–81.

Mountain Bike Action, "AMP Mongoose", Jul. 1992, pp. 5 pgs.

Mountain Bike Action, "Buyer's Guide", May 1993, pp. 108 & 110.

Mountain Biking; "Pass Press 93"; Jan. 1993; vol. 7; No. 1; 10 pages.

Mountain Biking, "Yeti–Lawwill DH: The Bike That Mert Built". Vol. 10, No. 9, Sep. 1996, pp. 64–70.

Mountain Bike, "Yeti Downhill Bike", Sep. 1996, vol. 12, No. 8, pp. 71–75.

Mountain & City Biking, "Slingshot", 6 pgs.

Offroad Pro–Flex 550—3 pgs.—Offroad.

Trek 9000 Series Spec="This Beauty Is A Beast"—Article—8 pages.

BICYCLE WITH CRANK ASSEMBLY SUSPENSION SYSTEM

RELATED APPLICATION

The present application is a continuation-in-part of U.S. application Ser. No. 08/959,377 entitled BICYCLE WITH CRANK ASSEMBLY SUSPENSION SYSTEM filed Oct. 28, 1997.

FIELD OF THE INVENTION

The present invention relates generally to bicycles, and more particularly to a bicycle including an independent suspension system for its crank assembly which interacts with the main frame and shock absorbing rear assembly of the bicycle in a manner adapted to enhance the overall performance thereof.

BACKGROUND OF THE INVENTION

There is currently known in the prior art a wide variety of bicycles which include shock absorbing rear assemblies. Such bicycles typically include a main frame which comprises an elongate top tube rigidly secured to and extending between a head tube and an elongate seat tube. The head tube provides a structural base for the stem of the bicycle which has the handle bars attached thereto. The seat tube itself provides a base for a seat post which is generally telescopically received thereinto and to which is secured the saddle or seat of the bicycle. In the main frame, the seat tube includes a generally cylindrical bottom bracket shell attached to the bottom end thereof. The bottom bracket shell accommodates the crank assembly of the bicycle. The crank assembly itself comprises a bottom bracket spindle which includes a pair of cranks and a chain wheel attached thereto. Rigidly secured to and extending between the head tube and the bottom bracket shell is an elongate down tube of the main frame.

The shock absorbing rear assemblies of the prior art bicycles take on a wide variety of different configurations. In one commonly used configuration, the rear assembly comprises a pair of chain stays, the front ends of which are pivotally connected to the main frame. The back ends of the chain stays are attached to respective ones of a pair of drop-outs which accommodate the axle of the rear wheel. Also attached to respective ones of the drop-outs are the bottom ends of a pair of seat stays or swingarms, the top ends of which are attached to one end of a shock absorber. The end of the shock absorber opposite that attached to the swingarms is itself attached to a portion of the main frame. The shock absorber is actuated by and effectively dampens the upward travel of the rear wheel axle as occurs when the rear wheel encounters a bump or other obstruction.

As previously indicated, the above-described rear assembly is exemplary only, in that many variations of shock absorbing rear assemblies exist in the prior art. In this respect, certain rear assemblies include an additional link which extends between the swingarms and the main frame, with the shock absorber itself extending between such additional link and the main frame. The common characteristics of all shock absorbing rear assemblies is that they include the rear wheel rotatably connected thereto and are movable independently of the main frame for purposes of facilitating the actuation of the shock absorber and the dampening of the upward movement of the rear wheel.

Those prior art bicycles including shock absorbing rear assemblies possess certain deficiencies which detract from their overall utility. One such deficiency is attributable to the lack of efficiency in the transmission of energy from the rider to the rear wheel of the bicycle. This lack of efficiency occurs as a result of the crank assembly not being independently suspended relative to the main frame and rear assembly. Due to this lack of independent suspension, when the rider mounts the bicycle and begins pedalling, the pedalling force exerted by the rider is initially absorbed by the shock absorbing rear assembly to facilitate its actuation to an equilibrium position. It is only after the rear assembly is actuated to its equilibrium position that the pedalling force is translated into the forward acceleration of the bicycle.

A further deficiency with prior art bicycles including shock absorbing rear assemblies which is attributable to the lack of an independently suspended crank assembly is the tendency for pedal "kick-back" to occur when the rear assembly, and in particular the rear wheel thereof, encounters a significant bump or other obstruction. In the prior art shock absorbing rear assemblies, the chain extending between the crank assembly and the rear wheel is used to over constrain the suspension system when the rear wheel undergoes a moderate to significant amount of upward travel. Since the suspension system is over constrained by the chain, further upward movement of the rear wheel beyond a certain threshold necessitates that the chain rotate the chain wheel of the crank assembly backward. Since the chain wheel is attached to the pedals via the bottom bracket spindle and cranks, the backward rotation of the chain wheel results in the application of a kick-back force to the rider's feet. As will be recognized, occurrences of pedal kick-back are most frequent during use of the bicycle on off-road, uneven terrain wherein significant shocks are frequently applied to the rear wheel.

The present invention addresses these deficiencies of prior art bicycles including shock absorbing rear assemblies by providing a bicycle wherein the crank assembly is independently suspended relative to the main frame and rear assembly. In the present bicycle, the suspension system for the crank assembly is settled into a neutral position by the weight of the rider upon the bicycle, and interacts with the shock absorbing rear assembly in a manner providing for a significantly more efficient transmission of pedaling force from the rider to the rear wheel. Additionally, due to the crank assembly being independently suspended relative to the main frame and shock absorbing rear assembly of the bicycle, occurrences of pedal kick-back are substantially reduced when the rear wheel encounters a bump or other obstruction.

SUMMARY OF THE INVENTION

In accordance with a first embodiment of the present invention, there is provided a bicycle including an independent equilibrium sensing suspension system for its crank assembly which is adapted to maximize the efficiency of the transmission of energy from the rider to the rear wheel. The bicycle of the first embodiment comprises a main frame which includes an elongate seat tube having an elongate down tube attached thereto. Pivotally connected to the main frame is a shock absorbing rear assembly of the bicycle.

In the first embodiment, the rear assembly of the bicycle comprises a pair of chain stays, the front ends of which are pivotally connected to the main frame, and more particularly either the seat tube, down tube, or a transitional area therebetween. The rear assembly further comprises a pair of drop-outs which are rigidly attached to respective ones of the back ends of the chain stays, and a pair of swing arms, the bottom ends of which are rigidly attached to respective ones of the drop-outs. Pivotally connected to the top ends of the swingarms is one end of a shock absorber of the rear assembly, the other end of which is pivotally connected to the main frame, and in particular the seat tube thereof. The shock absorber may comprise a fluid-damped cylinder alone or in combination with a spring, an elastomer, or a flexible link. If the shock absorber comprises a flexible link, the opposed ends thereof will typically be rigidly rather than pivotally connected to the swingarms and seat tube. In addition to the chain stays, drop-outs, swingarms, and shock absorber, the rear assembly includes a tubular, generally cylindrical bottom bracket shell which is rigidly attached to the chain stays in close proximity to the front ends thereof.

In addition to the main frame and rear assembly, the bicycle constructed in accordance with the first embodiment of the present invention includes an eccentric link which is rotatably connected to the rear assembly, and more particularly is rotatably mounted within the bottom bracket shell of the rear assembly via one or more bearing members. The eccentric link defines a central axis, and is rotatable relative to the bottom bracket shell about its central axis.

The crank assembly of the bicycle constructed in accordance with the first embodiment comprises a bottom bracket spindle which is rotatably connected to and extends through the eccentric link along a spindle axis which is offset from and generally parallel to the central axis of the eccentric link. Attached to respective ones of the opposed ends of the bottom bracket spindle is a pair of elongate cranks of the crank assembly, each of which includes a pedal rotatably connected thereto. Also attached to the bottom bracket spindle is a chain wheel which rotates concurrently therewith.

The bicycle of the first embodiment also includes a rear wheel which is rotatably connected to the rear assembly, and in particular to the drop-outs thereof. Attached to the axle of the rear wheel is a rear wheel sprocket which is mechanically coupled to the chain wheel via an elongate chain such that the rotation of the chain wheel facilitates the concurrent rotation of the rear wheel sprocket and hence the rear wheel.

The bicycle of the first embodiment further comprises a sensing link which is attached to and extends between the eccentric link and the main frame. The sensing link is preferably rigid, and includes one end which is pivotally connected to the eccentric link, with the opposite end being pivotally connected to the main frame, and more particularly to a mounting bracket attached to and extending downwardly from the down tube of the main frame. The sensing link may alternatively comprise a flexible link, the opposed ends of which are rigidly attached to the eccentric link and main frame, respectively. The sensing link resists the rotational movement of the eccentric link, with the length of the sensing link preferably being adjustable for purposes of selectively modifying the performance characteristics of the shock absorbing rear assembly under certain riding conditions.

In accordance with a second embodiment of the present invention, the main frame of the bicycle comprises an elongate seat tube, an elongate down tube, and a tubular, generally cylindrical bottom bracket shell which is rigidly attached to the bottom ends of the seat and down tubes. Pivotally connected to the main frame is a shock absorbing rear assembly.

In the second embodiment, the rear assembly of the bicycle comprises a pair of chain stays, the front ends of which are pivotally connected to the main frame, and in particular the seat tube thereof. The rear assembly further comprises a pair of drop-outs which are rigidly attached to respective ones of the back ends of the chain stays, and a pair of swingarms, the bottom ends of which are rigidly attached to respective ones of the drop-outs. In addition to the chain stays, drop-outs, and swingarms, the rear assembly includes a shock absorber, one end of which is pivotally connected to the top ends of the swingarms, with the other end being pivotally connected to the main frame, and in particular the seat tube thereof. As in the first embodiment, the shock absorber of the second embodiment may comprise a fluid-damped cylinder alone or in combination with a spring, an elastomer, or a flexible link which is rigidly rather than pivotally connected to the swingarms and seat tube.

The bicycle of the second embodiment further comprises an eccentric link which is rotatably connected to the main frame, and more particularly is rotatably mounted within the bottom bracket shell of the main frame via one or more bearing members. As in the first embodiment, the eccentric link of the second embodiment defines a central axis, and is rotatable relative to the bottom bracket shell about its central axis. The eccentric link also accommodates the crank assembly of the bicycle which comprises a bottom bracket spindle rotatably connected to and extending through the eccentric link. The bottom bracket spindle extends along a spindle axis which is offset from and generally parallel to the central axis of the eccentric link. Attached to respective ones of the opposed ends of the bottom bracket spindle is a pair of cranks, each of which includes a pedal rotatably connected thereto. Also attached to the bottom bracket spindle is a chain wheel which rotates concurrently therewith.

The bicycle of the second embodiment further comprises a rear wheel which is rotatably connected to the rear assembly, and in particular to the drop-outs thereof. Attached to the axle of the rear wheel is a rear wheel sprocket which is mechanically coupled to the chain wheel via an elongate chain such that the rotation of the chain wheel facilitates the concurrent rotation of the rear wheel sprocket and hence the rear wheel.

The bicycle of the second embodiment further comprises a sensing link which is attached to and extends between the eccentric link and the rear assembly. The sensing link of the second embodiment is also preferably rigid, with one thereof being pivotally connected to the eccentric link and the opposite end being pivotally connected to a mounting bracket attached to and extending downwardly from one or both of the chain stays of the rear assembly. The sensing link may alternatively comprise a flexible link, the opposed ends of which are rigidly rather than pivotally connected to the eccentric link and chain stay(s), respectively. In the second embodiment, the length of the sensing link is also adjustable for purposes of selectively modifying the performance characteristics of the shock absorbing rear assembly under certain riding conditions.

In accordance with a third embodiment of the present invention, the main frame of the bicycle comprises an elongate seat tube having an elongate down tube attached thereto. Pivotally connected to the main frame is a shock absorbing rear assembly of the bicycle. In the third embodiment, the rear assembly itself comprises a pair of swingarms, the top ends of which are pivotally connected to the main frame, and in particular the seat tube thereof. The rear assembly further comprises a pair of drop-outs which are rigidly attached to respective ones of the bottom ends of the swingarms, and a pair of chain stays, the back ends of which are rigidly attached to respective ones of the drop-outs. In addition to the swingarms, drop-outs, and chain stays, the rear assembly includes a shock absorber, one end of which is pivotally connected to the swingarms, with the other end being pivotally connected to the main frame, and in particular the seat tube thereof. The shock absorber of the third embodiment may comprise a fluid-damped cylinder alone or in combination with a spring, an elastomer, or a flexible link which is rigidly rather than pivotally connected to the swingarms and seat tube.

The bicycle of the third embodiment further comprises a bottom bracket link which is attached to and extends between the main frame and the rear assembly. More particularly, the top end of the bottom bracket link is pivotally connected to the main frame, with the bottom end thereof being pivotally connected to the front ends of the chain stays. The bottom bracket link preferably includes a slot formed therein and is pivotally connected to the main frame and to the chain stays by respective ones of a pair of pivot pins. At least one of the pivot pins is extended into and moveable within the slot during the upward and downward movement of the rear assembly relative to the main frame. The movement of the pivot pin within the slot prevents the suspension system defined by the rear assembly and bottom bracket link from becoming overconstrained during the movement of the rear assembly relative to the main frame. It is contemplated that the bottom bracket link may be fabricated from a flexible, resilient material which allows the same to be rigidly rather than pivotally connected to the main frame and chain stays.

In the third embodiment, the bottom bracket link accommodates the crank assembly of the bicycle which comprises a bottom bracket spindle rotatably connected to and extending through the bottom bracket link. Attached to respective ones of the opposed ends of the bottom bracket spindle is a pair of cranks, each of which includes a pedal rotatably connected thereto. Also attached to the bottom bracket spindle is a chain wheel which rotates concurrently therewith. In the bicycle of the third embodiment, a rear wheel is rotatably connected to the rear assembly, and in particular to the drop-outs thereof. Attached to the axle of the rear wheel is a rear wheel sprocket which is mechanically coupled to the chain wheel via an elongate chain such that the rotation of the chain wheel facilitates the concurrent rotation of the rear wheel sprocket and hence the rear wheel.

In the bicycle of the third embodiment, the crank assembly, by virtue of its rotatable connection to the bottom bracket link, is independently suspended relative to the main frame and the rear assembly of the bicycle. The performance characteristics of the shock absorbing rear assembly under certain riding conditions may be modified by selectively increasing or decreasing the length of the bottom bracket link and/or the location of its pivotal connection to the main frame of the bicycle.

BRIEF DESCRIPTION OF THE DRAWINGS

These, as well as other features of the present invention, will become more apparent upon reference to the drawings wherein:

FIG. 1 is a perspective view of a bicycle constructed in accordance with a first embodiment of the present invention to include an independent equilibrium sensing suspension system for its crank assembly;

FIG. 2 is a partial perspective view of the bicycle shown in FIG. 1, illustrating the equilibrium sensing suspension system thereof;

FIG. 3 is an exploded view of the equilibrium sensing suspension system shown in FIG. 2;

FIG. 4 is a cross-sectional view taken along line 4—4 of FIG. 2;

FIG. 5 is a left side-elevational view of the main frame, rear assembly, and equilibrium sensing suspension system of the bicycle constructed in accordance with the first embodiment of the present invention as shown in FIGS. 1–4;

FIG. 6 is a left side-elevational view of the main frame, rear assembly, and equilibrium sensing suspension system of a bicycle constructed in accordance with a second embodiment of the present invention; and FIG. 7 is a left side-elevational view of the main frame, rear assembly, and crank assembly suspension system of a bicycle constructed in accordance with a third embodiment of the present application.

DETAILED DESCRIPTION OF THE PREFERRED EMBODIMENTS

Figure 1:
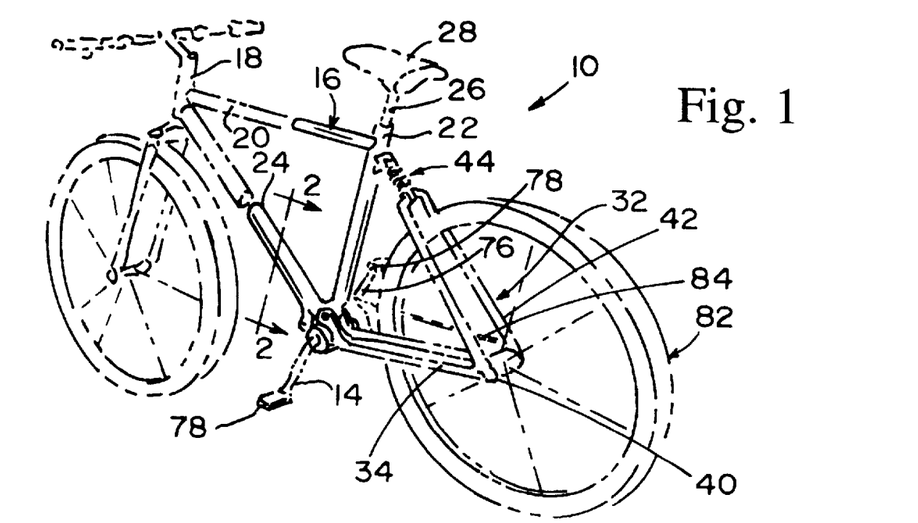
Figure 2:
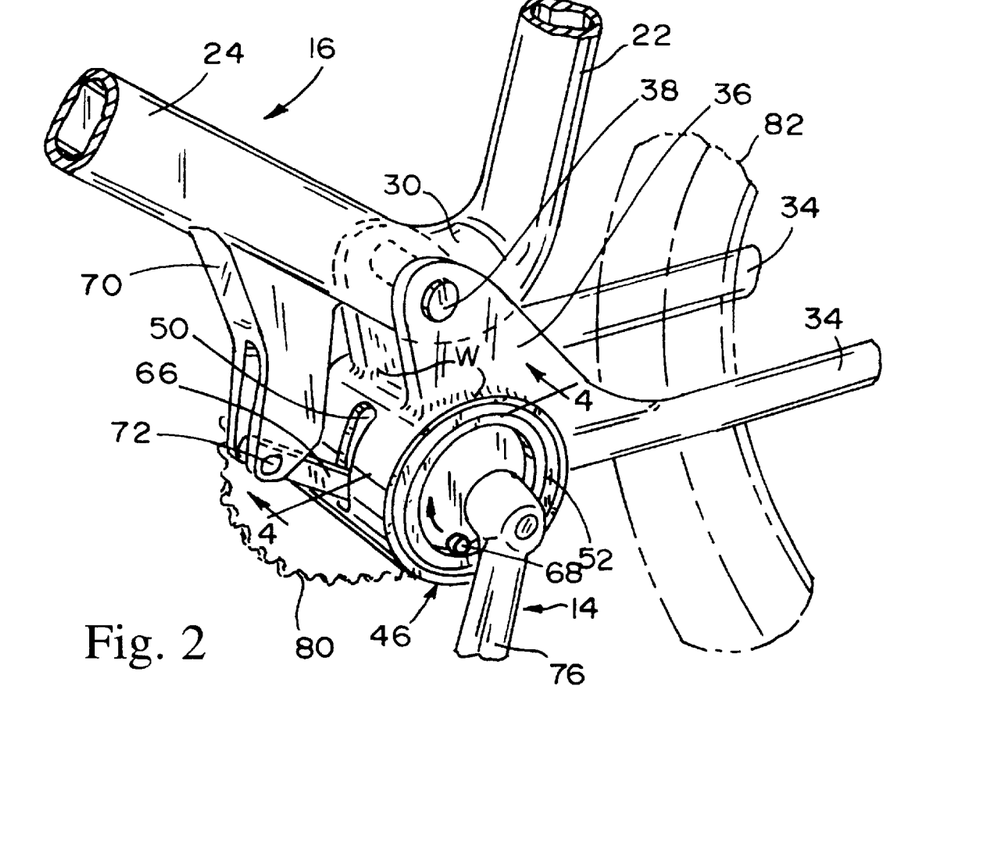

Referring now to the drawings wherein the showings are for purposes of illustrating preferred embodiments of the present invention only, and not for purposes of limiting the same, FIG. 1 perspectively illustrates a bicycle 10 constructed in accordance with a first embodiment of the present invention to include an independent equilibrium sensing suspension system 12 for the crank assembly 14 of the bicycle 10. The bicycle 10 comprises a main frame 16 which defines a front triangle of the bicycle 10 and includes a head tube 18, an elongate top tube 20, an elongate seat tube 22, and an elongate down tube 24. The front end of the top tube 20 and the top end of the down tube 24 are attached to the head tube 18 which accommodates the stem of the handle bars. Telescopically received into the top end of the seat tube 22 is a seat post 26 having a seat or saddle 28 attached to the top end thereof. As best seen in FIG. 2, the bottom ends of the seat and down tubes 22, 24 are interfaced to each other via a transitional section 30 of the main frame 16.

Figure 5:
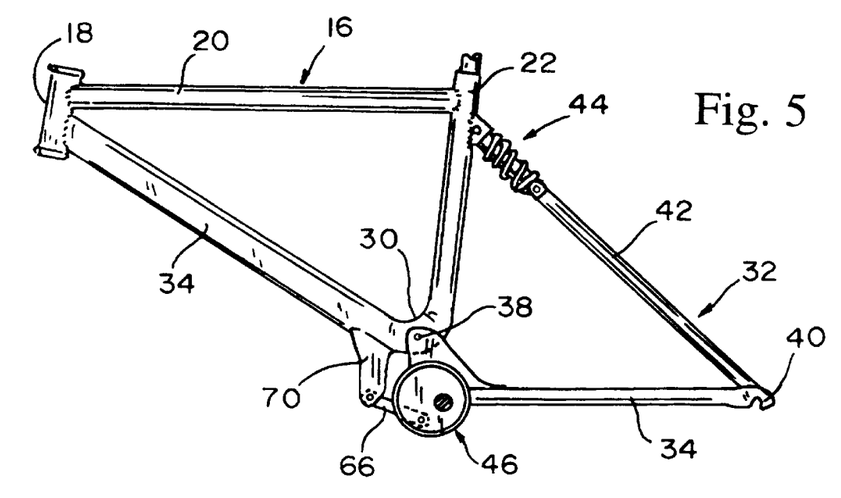

Referring now to FIGS. 1, 2 and 5, in addition to the main frame 16, the bicycle 10 of the first embodiment comprises a shock absorbing rear assembly 32 which is pivotally connected to the main frame 16 and generally defines a rear triangle of the bicycle 10. The rear assembly 32 comprises a pair of elongate chain stays 34, the front ends of which each include an upwardly extending ear portion 36 rigidly attached thereto. The ear portions 36 of the chain stays 34 extend along opposite sides of the transitional section 30 of the main frame 16, and are pivotally connected thereto via a fastener 38 such as a pivot pin. Though preferably pivotally connected to the transitional section 30, the ear portions 36 of the chain stays 34 may alternatively be pivotally connected to either the seat tube 22 or down tube 24 of the main frame 16 without departing from the scope of the present invention.

The rear assembly 32 further comprises a pair of drop-outs 40 which are rigidly attached to respective ones of the back ends of the chain stays 34. The rear assembly 32 also includes a pair of elongate seat stays or swingarms 42, the bottom ends of which are rigidly attached to respective ones of the drop-outs 40. Pivotally connected to the top ends of the swingarms 42 is one end of a shock absorber 44 of the rear assembly 32, the other end of which is pivotally connected to the seat tube 22 of the main frame 16. The shock absorber 44 may comprise a fluid-damped cylinder alone or in combination with a spring, an elastomer, or a flexible linkage member fabricated from spring steel, a composite material, or a fiber reinforced composite material. If the shock absorber 44 comprises the flexible linkage member, the opposed ends thereof will typically be rigidly rather than pivotally connected to the swingarms 42 and seat tube 22.

Figure 3:
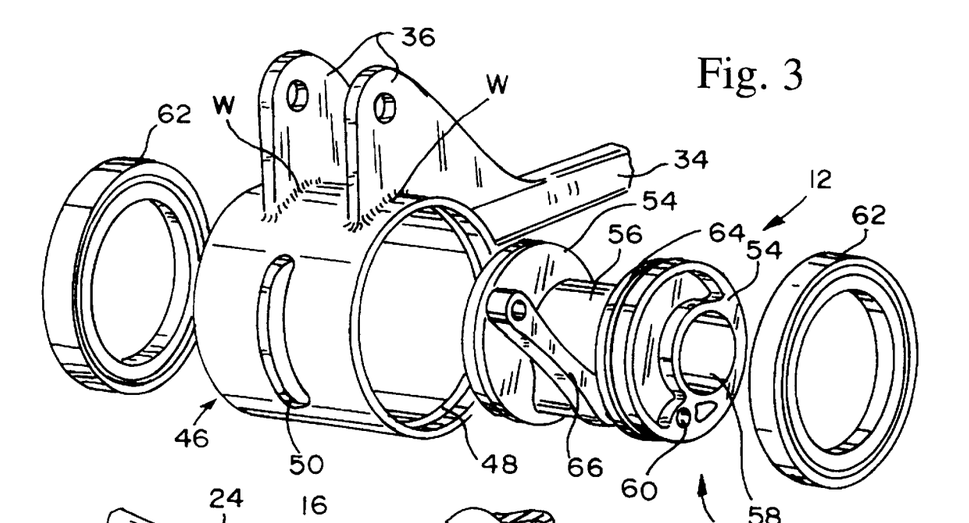
Figure 4:
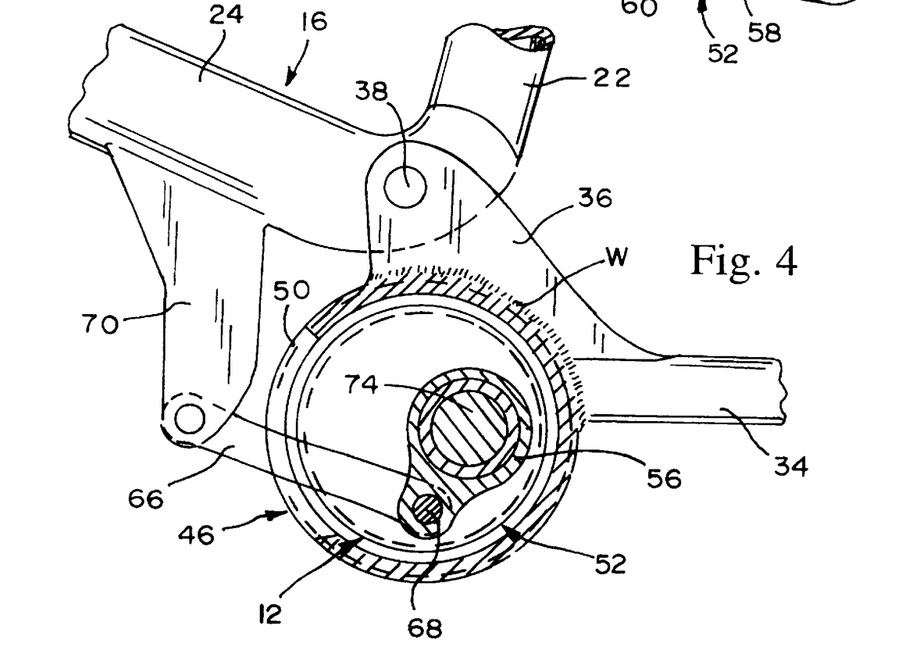

In addition to the chain stays 34, drop-outs 40, swingarms 42 and shock absorber 44, the rear assembly 32 includes a tubular, generally cylindrical bottom bracket shell 46. As best seen in FIGS. 2 and 4, the bottom bracket shell 46 is rigidly attached to the front ends of the chain stays 34 and to accurately contoured cut-outs within the ear portions 36 via welds W. As best seen in FIG. 3, the inner surface of the bottom bracket shell 46 is not of uniform diameter. Rather, the inner surface defines two (2) regions of increased diameter which extend to respective ones of the opposed ends of the bottom bracket shell 46. These regions of increased diameter are separated from the remainder of the inner surface of the bottom bracket shell 46 by respective ones of a pair of annular shoulders 48 formed therewithin. As seen in FIGS. 2–4, disposed within the bottom bracket shell 46 and extending therethrough into communication with the interior thereof is an elongate, accurately contoured slot 50. The slot 50 is disposed within the front of the bottom bracket shell 46 and therefore faces forwardly toward the front of the bicycle 10.

The suspension system 12 for the crank assembly 14 of the bicycle 10 comprises a generally spool-shaped eccentric link 52 which defines opposed, circularly configured end portions 54 and a central portion 56 extending therebetween. As best seen in FIG. 4, the central portion 56 includes a circularly configured region having an integral ear region extending therefrom. Extending through the ear portions 54 and circularly configured region of the central portion 56 is a bore 58, while extending through the end portions 54 and ear region of the central portion 56 is an aperture 60. Importantly, in the eccentric link 52, the circularly configured region of the central portion 56 does not extend axially between the end portions 54. As such, the axis of the bore 58 is radially offset from and extends in generally parallel relation to the central axis shared by and extending through the centers of the circularly configured end portions 54 of the eccentric link 52. The axis of the aperture 60 is itself radially offset from and extends in generally parallel relation to the central axis of the end portions 54. Disposed within the ear region of the central portion 56 is a notch which separates the aperture 60 into a pair of coaxially aligned segments.

In the suspension system 12, the eccentric link 52 is rotatably mounted within the bottom bracket shell 46. Such rotatable mounting is facilitated by a pair of bearing members 62 which are advanced over respective ones of the end portions 54 of the eccentric link 52. Formed within the outer surface of each end portion 54 is an annular shoulder 64, with the advancement of each bearing member 62 over a respective end portion 54 being limited by the abutment of the bearing member 62 against the annular shoulder 64 of the end portion 54. Portions of the bearing members 62 protrude radially beyond the end portions 54 when engaged thereto and are abutted against respective ones of the annular shoulders 48 when the eccentric link 52 is rotatably mounted within the bottom bracket shell 46.

In addition to the eccentric link 52, the suspension system 12 comprises an elongate sensing link 66. In the suspension system 12, one end of the sensing link 66 is pivotally connected to the eccentric link 52, and in particular the ear region of the central portion 56 thereof. Such pivotal connection is facilitated by the insertion of one end of the sensing link 66 into the notch disposed within the ear region, and the subsequent advancement of a fastener 68 such as a pivot pin through the segments of the aperture 60 which are coaxially aligned with an aperture extending through the end of the sensing link 66 therebetween. The sensing link 66 extends through the slot 50 and thus protrudes from the front of the bottom bracket shell 46. The end of the sensing link 66 opposite that pivotally connected to the eccentric link 52 is itself pivotally connected to a mounting bracket 70 rigidly attached to and extending downwardly from the bottom of the down tube 24. As best seen in FIG. 2, this end of the sensing link 66 is inserted between a juxtaposed pair of ear portions of the mounting bracket 70, with a fastener 72 such as a pivot pin being advanced through a pair of apertures within the ear portions of the mounting bracket 70 which are coaxially aligned with an aperture in the end of the sensing link 66 disposed therebetween.

In the suspension system 12, the sensing link 66 is preferably rigid. However, the sensing link 66 may alternatively comprise a flexible linkage member fabricated from spring steel, a composite material, or a fiber reinforced composite material. If the sensing link 66 comprises a flexible linkage member, the opposed ends thereof will be rigidly attached to the central portion 56 of the eccentric link 52 and mounting bracket 70, respectively, rather than being pivotally connected thereto. As will be discussed in more detail below, the sensing link 66 may be provided in differing lengths, or may be configured for purposes of allowing the length thereof to be selectively increased or decreased. As will also be discussed below, the sensing link, when extended between the eccentric link 52 and mounting bracket 70 in the above-described manner, resists the rotational movement of the eccentric link 52.

In the bicycle 10 of the present invention, the crank assembly 14 is rotatably connected to the eccentric link 52 of the suspension system 12. The crank assembly 14 comprises an elongate, generally cylindrical bottom bracket spindle 74 which is slidably advanced through and rotatable within the bore 58 of the eccentric link 52. The bottom bracket spindle 74 is sized such the opposed ends thereof protrude from respective ones of the end portions 54 of the eccentric link 52. The crank assembly 14 further comprises a pair of elongate cranks 76 which are attached to respective ones of the opposed ends of the bottom bracket spindle 74. Rotatably connected to the distal end of each crank 76 is a pedal 78. In addition to the bottom bracket spindle 74, cranks 76 and pedals 78, the crank assembly 14 includes a chain wheel 80 which is attached to the bottom bracket spindle 74 and rotates concurrently therewith. As will be recognized, due to the orientation of the bore 58 within the eccentric link 52, the axis of the bottom bracket spindle 74 is radially offset from and extends in generally parallel relation to the central axis of the eccentric link 52 which, as previously indicated, extends through the centers of the circularly configured end portions 54 thereof. Thus, though the bearing members 62 provide for the rotation of the eccentric link 52 relative to the bottom bracket shell 46 about its central axis, the bottom bracket spindle 74 is rotatable relative to the eccentric link 52 about its spindle axis which is radially offset from the central axis.

The bicycle 10 of the present invention further comprises a rear wheel 82 which is rotatably connected to the rear assembly 32, and in particular to the drop-outs 40 thereof. Attached to the axle of the rear wheel 82 is a rear wheel sprocket which is mechanically coupled to the chain wheel 80 via an elongate chain 84. As will be recognized, the rotation of the bottom bracket spindle 74 and hence the chain wheel 80 facilitates the concurrent rotation of the rear wheel sprocket and hence the rear wheel 82.

Having thus described the structural attributes of the bicycle 10 constructed in accordance with the first embodiment of the present invention, the functionality thereof, and in particular the suspension system 12 for the crank assem- bly 14, will now be described. In the bicycle 10, prior to the rider mounting the saddle 28, the sensing link 66 is neither in tension or compression. When the rider initially mounts the bicycle 10 (i.e., sits upon the saddle 28), the weight of the rider causes a force to be transmitted downwardly through the seat tube 22 which results in a slight actuation of the rear assembly 32. In this respect, the main frame 16 is forced downwardly relative to the rear assembly 32, which results in the upward pivotal movement of the rear assembly 32 relative to the main frame 16 and a slight compression of the shock absorber 44. This actuation of the rear assembly 32 is commonly described as the bicycle 10 settling in to a ride height when the rider mounts the saddle 28. In viewing the bicycle 10 from its left side as shown in FIGS. 1, 2, 4 and 5, the slight actuation of the rear assembly 32 as occurs when the bicycle 10 settles into its ride height results in a small amount of clockwise rotation of the eccentric link 52. However, despite such rotation, the sensing link 66 is still neither in tension or compression.

Though the sensing link 66 is neither in tension or compression when the bicycle 10 settles into its ride height, the small amount of clockwise rotation that the eccentric link 52 undergoes causes it to assume an angular position relative to the drive train of the bicycle 10 (comprising the crank assembly 14, chain 84 and rear wheel sprocket) wherein the application of a pedalling force to the crank assembly 14 by the rider immediately places the sensing link 66 into tension. In this respect, the application of the pedalling force to the crank assembly 14 results in the counter-clockwise rotation of the eccentric link 52 relative to the bottom bracket shell 46 as viewed from the left side of the bicycle 10 which places the sensing link 66 into tension. Importantly, the placement of the sensing link 66 into tension effectively stiffens the shock absorbing rear assembly 32 since the upward pivotal movement thereof relative to the main frame 16 beyond a certain threshold is resisted by the sensing link 66. When the rider stops pedalling, the cessation of the pedalling force results in the clockwise rotation of the eccentric link 52 and the return of the sensing link 66 to its position wherein it is neither in tension or compression.

If, while riding the bicycle 10, the rider stops pedalling and lifts off of the saddle 28, the resultant downward force applied to the pedals 78 of the crank assembly 14 will cause the rotation of the eccentric link 52 in a clockwise direction relative to the bottom bracket shell 46 as viewed from the right side of the bicycle 10, and the placement of the sensing link 66 into compression. The placement of the sensing link 66 into compression effectively softens the shock absorbing rear assembly 32 since the upward pivotal movement thereof relative to the main frame 16 is not resisted by the sensing link 66. As such, the shock absorbing rear assembly 32 of the bicycle 10, while being stiffened when the rider pedals the bicycle 10, may be softened by the rider discontinuing such pedalling and lifting off of the saddle 28 so as to stand on the pedals 78. Thus, in the bicycle 10, the sensing link 66 along with the shock absorber 44 regulates the wheel rate (i.e., stiffness or softness) or the rear assembly 32.

Since, as previously described, the initiation of the pedalling force after the bicycle 10 settles into its ride height causes the sensing link 66 to move immediately into tension, such pedalling force is translated into the rotation of the rear wheel 82 and the forward acceleration of the bicycle 10 with a minimal amount of loss, and hence a maximum level of efficiency. Additionally, due to the manner in which the suspension system 12 interacts with the main frame 16 and rear assembly 32, the actuation of the rear assembly 32 beyond a certain threshold is not overconstrained by the chain 84, and thus does not result in occurrences of pedal kick-back. The length of the sensing link 66 may be selectively increased or decreased for purposes of tuning the suspension system 12. In this respect, the sensing link 66 is preferably sized such that when the bicycle 10 is settled into its ride height, the angular position of the eccentric link 52 relative to the drive train of the bicycle 10 is such that the sensing link 66 will immediately be put into tension upon the application of a pedalling force to the crank assembly 14 by the rider and will be put into compression if the rider stands upon the pedals 78. In the bicycle 10, the main frame 16, rear assembly 32, eccentric link 52, and sensing link 66 define respective ones of the links of a four-bar linkage system.

Figure 6:
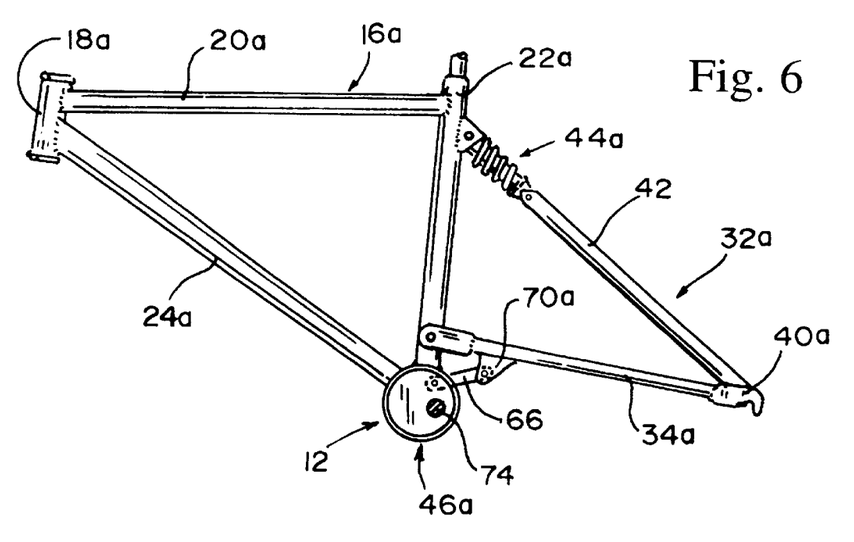

Referring now to FIG. 6, in accordance with a second embodiment of the present invention, the bicycle may be provided with a main frame 16a which is substantially similar to the previously described main frame 16 and includes a head tube 18a, a top tube 20a, a seat tube 22a, and a down tube 24a. However, in contrast to the main frame 16, the main frame 16a further includes a bottom bracket shell 46a which is identical to the previously described bottom bracket shell 46, and is rigidly attached to the bottom ends of the seat tube 22a and down tube 24a such that the slot thereof faces rearwardly toward the rear wheel of the bicycle.

In addition to the main frame 16a, the bicycle of the second embodiment includes a shock absorbing rear assembly 32a which is pivotally connected to the main frame 16a and comprises a pair of elongate chain stays 34a, the front ends of which are pivotally connected to the seat tube 22a of the main frame 16a. Rigidly attached to respective ones of the back ends of the chain stays 34a is a pair of drop-outs 40a. The rear assembly 32a also includes a pair of elongate seat stays or swingarms 42a, the bottom ends of which are rigidly attached to respective ones of the drop-outs 40a. Pivotally connected to the top ends of the swingarms 42a is one end of a shock absorber 44a, the other end of which is pivotally connected to the seat tube 22a of the main frame 16a. The shock absorber 44a is identical to the previously described shock absorber 44 and may comprise any one of the above-described alternatives thereto.

The bicycle of the second embodiment includes the previously described suspension system 12, as well as the previously described crank assembly 14 which is rotatably connected to the suspension system 12. The eccentric link 52 of the suspension system 12 is rotatably mounted within the bottom bracket shell 46a in the above-described manner through the use of the bearing members 62. However, the sensing link 66 of the suspension system 12 does not extend forwardly from the bottom bracket shell 46a, but rather extends rearwardly therefrom through the slot thereof. In this respect, the end of the sensing link 66 opposite that pivotally connected to the eccentric link 52 is pivotally connected to a mounting bracket 70a which is rigidly attached to and extends downwardly from one or both of the chain stays 34a of the rear assembly 32a. The mounting bracket 70a may also be attached directly to one or both of the swingarms 42a. As such, in contrast to the bicycle 10 constructed in accordance with the first embodiment, in the bicycle of the second embodiment, the sensing link 66 of the suspension system 12 extends between the eccentric link 52 and rear assembly 32a, as opposed to extending between the eccentric link 52 and main frame 16. However, the suspension system 12 within the bicycle constructed in accordance with the second embodiment functions in the same manner as previously described in relation to the first embodiment.

Figure 7:
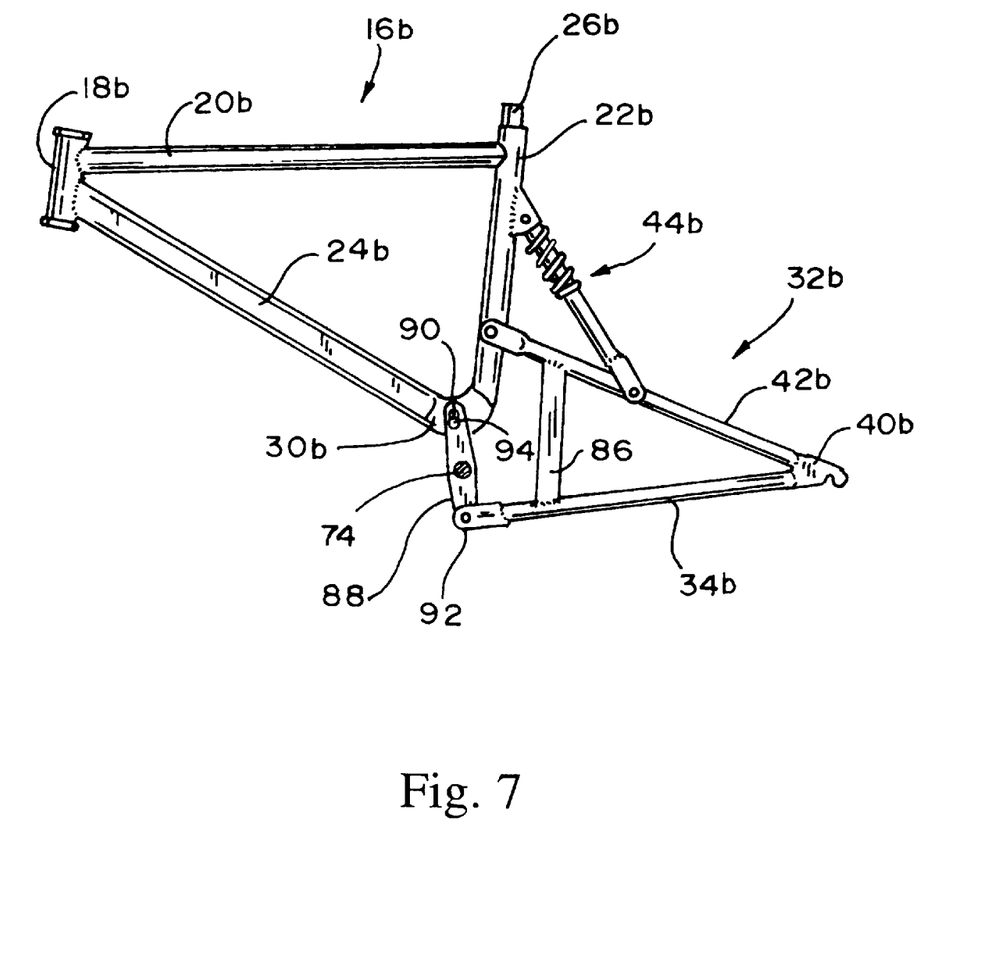

Referring now to FIG. 7, there is depicted a bicycle constructed in accordance with a third embodiment of the present invention which is provided with a main frame 16*b* including a head tube 18*b*, a top tube 20*b*, a seat tube 22*b*, and a down tube 24*b*. The main frame 16*b* is virtually identical in construction to the previously described main frame 16, with the front end of the top tube 20*b* and the top end of the down tube 24*b* being attached to the head tube 18*b* which accommodates the stem of the handlebars. Telescopically received into the top end of the seat tube 22*b* is a seat post 26*b* having a seat or saddle (not shown) attached to the top end thereof. The bottom ends of the seat and down tubes 22*b*, 24*b* are interfaced to each other via a transitional section 30*b* of the main frame 16*b*.

In addition to the main frame 16*b*, the bicycle of the third embodiment includes a shock absorbing rear assembly 32*b* which is pivotally connected to the main frame 16*b* and comprises a pair of elongate seat stays or swingarms 42*b*, the top ends of which are pivotally connected to the seat tube 22*b* of the main frame 16*b*. Rigidly attached to respective ones of the bottom ends of the swingarms 42*b* is a pair of drop-outs 40*b*. The rear assembly 32*b* also includes a pair of elongate chain stays 34*b*, the back ends of which are rigidly attached to respective ones of the drop-outs 40*b*. Pivotally connected to the swingarms 42*b* is one end of a shock absorber 44*b*, the other end of which is pivotally connected to the seat tube 22*b* of the main frame 16*b*. The shock absorber 44*b* is identical to the previously described shock absorber 44 and may comprise any one of the above-described alternatives thereto. Extending between respective pairs of the swingarms 42*b* and chain stays 34*b* is a pair of reinforcement struts 86.

The bicycle of the third embodiment includes the previously described crank assembly 14 which is independently suspended relative to the main frame 16*b* and the rear assembly 32*b* by a bottom bracket link 88 of the bicycle. The top end of the bottom bracket link 88 is pivotally connected to the main frame 16*b*, and more particularly the transitional section 30*b* thereof, via a first pivot pin 90. The bottom end of the bottom bracket link 88 is itself pivotally connected to the front ends of the chain stays 34*b* of the rear assembly 32*b* via a second pivot pin 92.

As seen in FIG. 7, the bottom bracket spindle 74 of the crank assembly 14 of the bicycle of the third embodiment extends laterally through the approximate center of the bottom bracket link 88. Thus, due to the pivotal connection of the opposed ends of the bottom bracket link 88 to the main frame 16*b* and rear assembly 32*b*, respectively, the bottom bracket spindle 74, and hence the crank assembly 14, is independently suspended relative to the main frame 16*b* and rear assembly 32*b*.

In the third embodiment, the bottom bracket link 88 is preferably fabricated from a rigid material. As such, disposed within the upper portion of the bottom bracket link 88 is a slot 94 which accommodates the first pivot pin 90. Importantly, as the rear assembly 32*b* is actuated upwardly and downwardly relative to the main frame 16*b*, the first pivot pin 90 is moveable within the slot 94, thus preventing the suspension system defined by the rear assembly 32*b* and bottom bracket link 88 from becoming overconstrained during the movement of the rear assembly 32*b* relative to the main frame 16*b*. However, it is contemplated that the bottom bracket link 88 may be fabricated from a flexible, resilient material, with the opposed ends thereof being rigidly rather than pivotally connected to the main frame 16*b* and rear assembly 32*b*. As will be recognized, the fabrication of the bottom bracket link 88 from such flexible, resilient material will eliminate the first and second pivot pins 90, 92, and hence the need for the slot 94. However, the flexibility of this alternative bottom bracket link 88 still has the effect of causing the crank assembly 14 to be independently suspended relative to the main frame 16*b* and rear assembly 32*b*.

As indicated above, the crank assembly 14, by virtue of its rotatable connection to the bottom bracket link 88, is independently suspended relative to the main frame 16*b* and rear assembly 32*b* of the bicycle of the third embodiment. The performance characteristics of the bicycle of the third embodiment may be modified by selectively increasing or decreasing the length of the bottom bracket link 88 and/or the location at which it is pivotally connected to the main frame 16*b*.

Additional modifications and improvements of the present invention may also be apparent to those of ordinary skill in the art. For example, the back ends of the chain stays and/or bottom ends of the swingarms of any embodiment of the present invention may be pivotally rather than rigidly attached to the drop-outs. Thus, the particular combination of parts described and illustrated herein is intended to represent only certain embodiments of the present invention, and is not intended to serve as limitations of alternative devices within the spirit and scope of the invention.

What is claimed is:

1. A bicycle having an equilibrium sensing suspension system, the bicycle comprising:

a main frame;

a rear assembly movably mounted to the main frame and including at least one swing arm and at least one chain stay;

a bottom bracket link pivotally connected to the main frame and the rear assembly at respective ones of at least two pivot points; and a crank assembly rotatably mounted within the bottom bracket link and independently suspended relative to the main frame and the rear assembly thereby.

2. The bicycle of claim 1 wherein:

the bottom bracket link includes a slot formed therein and is pivotally connected to the main frame and the rear assembly by respective ones of a pair of pivot pins; and at least one of the pivot pins is extended into and moveable within the slot.

3. The bicycle of claim 1 wherein the rear assembly comprises:

a pair of swingarms pivotally connected to the main frame;

a pair of drop-outs attached to respective ones of the swingarms;

a pair of chain stays attached to respective ones of the drop-outs; and a shock absorber pivotally connected to an extending between the swingarms and the main frame;

the bottom bracket link being pivotally connected to the main frame and at least one of the chain stays.

4. The bicycle of claim 3 wherein the main frame comprises:

an elongate seat tube; and an elongate down tube attached to said seat tube;

the swingarms and the shock absorber being pivotally connected to the seat tube.

5. In a bicycle having a main frame and a rear assembly movably mounted to the main frame, the improvement comprising:

an eccentric link rotatable mounted within at least one of the main frame and the rear assembly; and a crank assembly rotatable mounted within the eccentric link;

the crank assembly being independently suspended relative to the main frame and the rear assembly by the eccentric link.

6. The bicycle of claim 5 wherein the eccentric link is rotatable mounted within the rear assembly.

7. The bicycle of claim 5 wherein the eccentric link is rotatably mounted within the main frame.

8. A bicycle having an equilibrium sensing suspension system, the bicycle comprising:

a main frame;

a rear assembly movably mounted to the main frame;

a bottom bracket link having a slot formed therein, the bottom bracket link being pivotally connected to the main frame and the rear assembly by respective ones of a pair of pivot pins, with one of the pivot pins being extended into and movable within the slot; and a crank assembly rotatably mounted within the bottom bracket link and independently suspended relative to the main frame and the rear assembly thereby.

9. A bicycle having an equilibrium sensing suspension system, the bicycle comprising:

a main frame;

a rear assembly movably mounted to the main frame;

an eccentric link rotatably mounted within at least one of the main frame and the rear assembly; and a crank assembly rotatably mounted within the eccentric link;

the crank assembly being independently suspended relative to the main frame and the rear assembly by the eccentric link.

10. The bicycle of claim 9 wherein the eccentric link is rotatably mounted within the rear assembly.

11. The bicycle of claim 9 wherein the eccentric link is rotatably mounted within the main frame.

* * * * *